United States Patent [19]

Toliver, Jr. et al.

[11] Patent Number: 4,920,681
[45] Date of Patent: May 1, 1990

[54] FISHING POLE HOLDER APPARATUS

[76] Inventors: Joseph Toliver, Jr., 8717 Dolomite, El Paso, Tex. 79904; John T. Crank, 4821 Junction, El Paso, Tex. 79924

[21] Appl. No.: 392,370
[22] Filed: Aug. 11, 1989
[51] Int. Cl.$^5$ .............................................. A01K 97/10
[52] U.S. Cl. ..................................... 43/21.2; 248/514
[58] Field of Search ................. 43/21.2; 248/519, 520, 248/538, 539, 514, 517

[56] References Cited

U.S. PATENT DOCUMENTS

| 3,881,269 | 5/1975 | Timmons | 43/21.2 |
| 4,202,125 | 5/1980 | Kovacs | 43/21.2 |
| 4,219,955 | 9/1980 | Lo Bosco | 43/21.2 |
| 4,676,019 | 6/1987 | Engles | 43/21.2 |

Primary Examiner—M. Jordan
Attorney, Agent, or Firm—Leon Gilden

[57] ABSTRACT

A fishing pole holder apparatus is set forth wherein a spring biased fishing pole holder is secured in a lowered first position with a hook link and is biased to a second position upon release of the hook link on tensioning of the holder by a fish getting caught by an associated hook of the fishing pole arrangement.

6 Claims, 1 Drawing Sheet

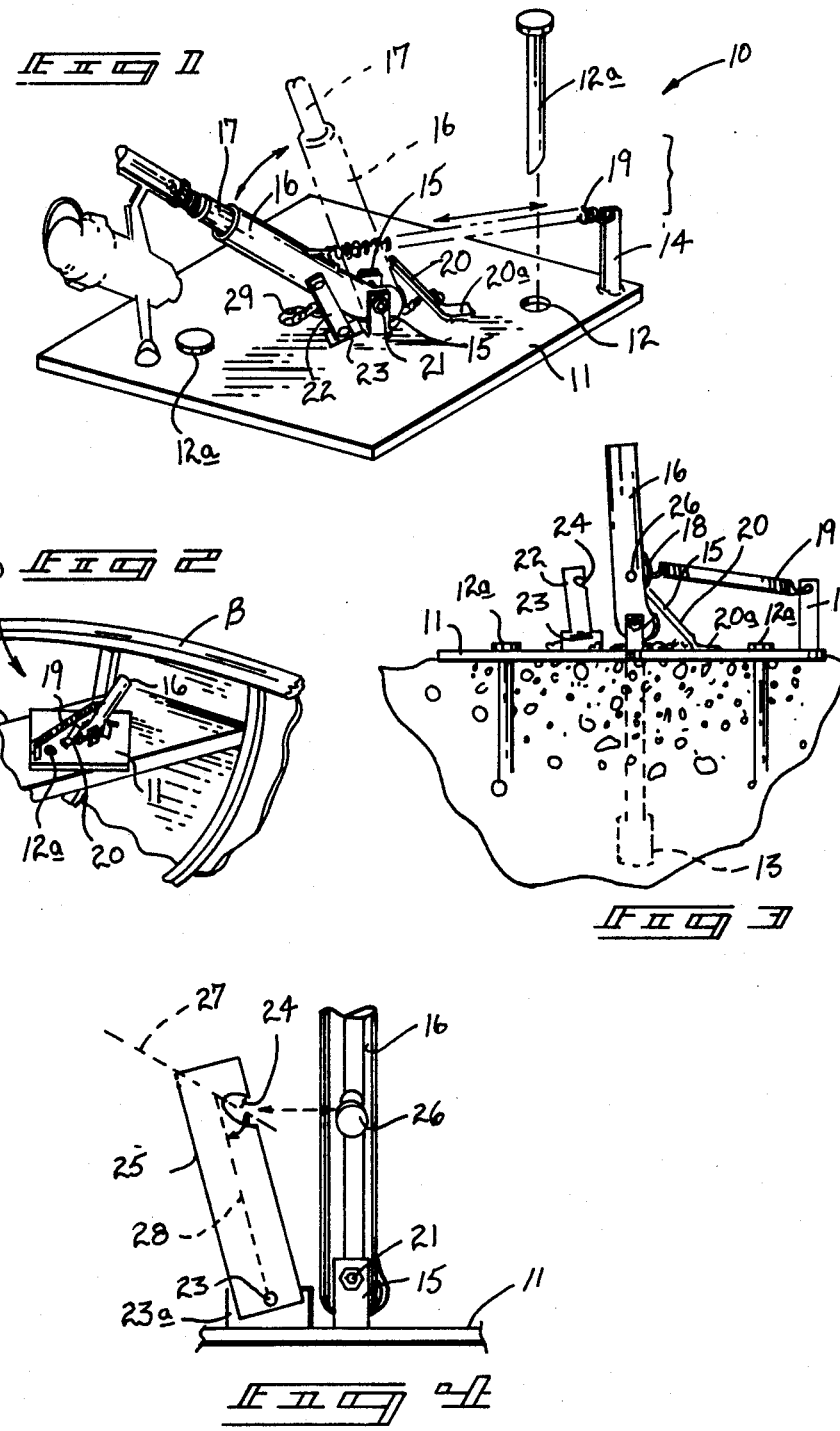

FISHING POLE HOLDER APPARATUS

BACKGROUND OF THE INVENTION

1. Field of the Invention

The field of invention relates to fishing pole holders, and more particularly pertains to a new and improved fishing pole holder secured in a first forward position by a hook link and released to a second vertical position to withdraw a fish upon a strike being effected by a fish.

2. Description of the Prior Art

The use of fishing pole holders to withdraw a fish secured by the fishing pole apparatus has been utilized in the prior art. The prior art heretofore, however, has utilized relatively complex organizations to effect retraction of a fish by a pole apparatus utilized. For example, U.S. Pat. No. 4,486,968 to Gould utilizes an anchor imbedded fishing rod support biased rearwardly by a spring arrangement and maintained in a forward position by a latch released upon a fish strike with a hook associated with a fishing pole apparatus.

U.S. Pat. No. 4,471,553 to Copeland sets forth a fishing rod holder arrangement wherein the trigger is actuated by rotation of a trip bar pivotally mounted onto an associated latch plate upon a fish strike directed onto a hook of the associated fishing rod arrangement.

U.S. Pat. No. 4,476,645 to Paarmann provides a fishing rod holder arrangement with a release mechanism wherein a rod link is secured to a plate member securing the fish holder arrangement, as opposed to the instant invention utilizing an elliptical rod link secured directly to an associated rod holder minimizing a need for the complex link arrangement of the Paarmann patent.

U S. Pat. No. 4,397,113 to Pinson wherein the rod retainer is held in the composition by a latch pivotally mounted on a support member whereupon the latch is released by an elongate trigger arm. The trigger arm utilizes a cam for movably engaging the latch, whereupon a strike is converted to rotation against the latch.

U.S. Pat. No. 4,676,018 to Kimball wherein a pivot mechanism to release the holder includes an eccentrically mounted release pin to release the rod holder upon a fish strike.

As such, it may be appreciated that there is a continuing need for a new and improved fishing pole holder apparatus wherein the same addresses both the problems of ease of use and effectiveness in simplicity of construction, and in this respect, the present invention substantially fulfills this need.

SUMMARY OF THE INVENTION

In view of the foregoing disadvantages inherent in the known types of fishing pole holders now present in the prior art, the present invention provides a fishing pole holder wherein the same utilizes a single hook link releasably securable to a fishing pole holder for releasing the same upon a fish strike. As such, the general purpose of the present invention, which will be described subsequently in greater detail, is to provide a new and improved fishing pole holder which has all the advantages of the prior art fishing pole holders and none of the disadvantages.

To attain this, the present invention includes a plurality of upstanding bosses pivotally mounting a fishing pole holder at a lowermost end thereof. A further boss rearwardly oriented and aligned medially of the first bosses includes a first spring for retracting the fishing pole holder to a rearward second position from a first forward position with a second spring member configured as an "L" shaped plate to provide an abutment and dampening member for impeding rearward retraction of the pole holder. A single hook link is mounted forwardly of the first bosses and includes a semi-elliptical opening formed with a major axis arranged at an acute angle relative to an elongate axis of the associated hook link wherein the hook link is pivotally mounted at its lower end with the opening arranged and directed downwardly relative to a forward surface of the hook link.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing pole holder which has all the advantages of the prior art fishing pole holders and none of the disadvantages.

It is another object of the present invention to provide a new and improved fishing pole holder which may be easily and efficiently manufactured and marketed.

It is a further object of the present invention to provide a new and improved fishing pole holder which is of a durable and reliable construction.

An even further object of the present invention is to provide a new and improved fishing pole holder which is susceptible of a low cost of manufacture with regard to both materials and labor, and which accordingly is then susceptible of low prices of sale to the consuming public, thereby making such fishing pole holders economically available to the buying public.

Still yet another object of the present invention is to provide a new and improved fishing pole holder which provides in the apparatuses and methods of the prior art some of the advantages thereof, while simultaneously overcoming some of the disadvantages normally associated therewith.

Still another object of the present invention is to provide a new and improved fishing pole holder wherein the same utilizes a single hook link securable to an elongate fishing pole holder to release the fishing pole holder to a rearward position upon a fish strike.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration secured within a boat arrangement.

FIG. 3 is an orthographic view of the instant invention secured to a ground surface.

FIG. 4 is an isometric illustration of a detailed view of the hook link and its association with the rod holder.

DESCRIPTION OF THE PREFERRED EMBODIMENT

With reference now to the drawings, and in particular to FIGS. 1 to 4 thereof, a new and improved fishing pole holder embodying the principles and concepts of the present invention and generally designated by the reference numeral 10 will be described.

More specifically, the fishing pole holder apparatus 10 essentially comprises a planar support base 11 including a plurality of securement apertures 12 formed upon a diagonal of the rectangular support base with fasteners 12a directed through the apertures 12 for securement to an underlying surface. A central elongate fastener 13 may be positioned through an axially centered opening formed to the support base, as desired. A first support link 14 is orthogonally mounted upwardly of an upper surface of the support base 11 adjacent a corner of the support base and positioned medially of two parallel second support links 15 positioned to straddle the axial center of the support base 11. A tubular rod holder 16 is pivotally mounted between the parallel second support links 15 for securement of a fishing rod 17 therewithin utilizing a support axle 21 directed through the second support links 15 and at a lowermost end of the tubular rod holder 16 diametrically therethrough. A spring securement clip 18 is integrally formed onto a rear surface of the tubular rod holder 16 in confronting relationship with the first support link with a first spring member 19 secured between the first support link 14 and the spring securement clip 18 to bias the rod holder 16 into a rearward second position from a first forward trigger position, to be described in more detail below. A second spring member 20 is defined as a generally "L" shaped member with a lower foot 20a mounted to an upper surface of the base 11. The second spring member 20 is oriented medially and rearwardly of the second support links 16 in alignment with the first support link 14 and positioned between the second support links and the first support link upon a diagonal defined by the rectangular support base 11.

An elongate hook link 22 is pivotally mounted forwardly in alignment with one of the second support links 15 with a lower pivot 23 mounted to a support base 23a. The hook link 22 includes a semi-elliptical opening 24 defined by a major axis, wherein the semi-elliptical opening is directed rearwardly and upwardly to a forward edge 25 of the hook link 22 to define an acute angle between the major axis 27 of the semi-elliptical opening 24 and the elongate link axis 28 directed medially of the hook link through the link pivot 23. A boss member 26 formed with an enlarged head is orthogonally and fixedly mounted to a side of the rod holder 16 wherein the boss member is of a diameter to be received within the semi-elliptical opening 24.

The rod holder 16, in a forward trigger position, is maintained in that orientation with the opening 24 receiving the shank of the boss member 26 therein, with the rearward biasing action of the first spring 19 maintaining the boss member within the opening 24 to maintain the rod holder 16 in the forward trigger position. Upon a fish strike, the impact of the fish strike will be transmitted to the fishing line and the rod holder 16 through the fishing rod 17 and thereby release the boss member 26 from the opening 24 and withdrawn to the second position, as illustrated in phantom in FIG. 1.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, &o include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod holder comprising,
   a planar base member, and
   a tubular rod member pivotally mounted at its lowermost end relative to an upper surface of the base member, and
   a first spring biasing the rod holder in a retracted second position, and
   a pivoted hook link mounted forwardly of the rod holder maintaining the rod holder in a first trigger position when the hook link is selectively secured to the rod holder a boss member, including an enlarged head and an elongate shank is orthogonally and integrally mounted to a side surface of the rod holder, and the hook link includes an opening directed rearwardly of a forward edge of the hook link to receive the boss member therein.

2. A fishing rod holder as set forth in claim 1 wherein the base member is of a rectangular configuration with the rod member pivotally mounted relative to a medial axis of the base member, and the first spring including a first support link mounted adjacent a rear corner of the base member positioned medially of spaced second links pivotally mounted on either side of the rod holder including an axis pivotally mounting the rod holder relative to the second links.

3. A fishing rod holder as set forth in claim 2 including a second spring mounted between the first support link and the second support links, wherein the second spring is of a generally "L" shaped configuration with a lower foot of the second spring secured to an upper surface of the base member and an upper leg of the second spring positioned rearwardly of the rod holder to provide an abutment and a dampening of the rod holder when retracted to the second position.

4. A fishing rod holder as set forth in claim 1 wherein the opening comprises a semi-elliptical opening oriented at an angle relative to the forward edge of the hook link and defined by a major elliptical axis, and the major elliptical axis is oriented at an acute angle relative to the longitudinal axis defined by the hook link.

5. A fishing rod holder as set forth in claim 4 wherein the hook link is pivotally mounted in alignment with one of said plurality of second support links.

6. A fishing rod holder as set forth in claim 5 wherein the semi-elliptical opening is positioned adjacent an upper end of the hook link.

* * * * *